United States Patent
Castelli

(10) Patent No.: US 10,071,307 B1
(45) Date of Patent: Sep. 11, 2018

(54) VIRTUAL REALITY HEADSET WITH RETRACTABLE EARPHONES

(71) Applicant: Tzumi Electronics LLC, New York, NY (US)

(72) Inventor: Joseph Castelli, New York, NY (US)

(73) Assignee: TZUMI ELECTRONICS LLC, New York, NY (US)

( * ) Notice: Subject to any disclaimer, the term of this patent is extended or adjusted under 35 U.S.C. 154(b) by 0 days.

(21) Appl. No.: 15/454,527

(22) Filed: Mar. 9, 2017

(51) Int. Cl.
*A63F 13/25* (2014.01)
*A63F 13/98* (2014.01)

(52) U.S. Cl.
CPC .............. *A63F 13/25* (2014.09); *A63F 13/98* (2014.09); *A63F 2300/8082* (2013.01)

(58) Field of Classification Search
CPC .................................. A63F 13/25; A63F 13/98
See application file for complete search history.

(56) References Cited

U.S. PATENT DOCUMENTS

| | | | |
|---|---|---|---|
| 5,451,976 A | 9/1995 | Ito | |
| 5,682,172 A | 10/1997 | Travers et al. | |
| 5,696,521 A | 12/1997 | Robinson et al. | |
| 6,084,555 A | 7/2000 | Masahiko et al. | |
| 6,144,864 A * | 11/2000 | Lands | H04M 1/15 361/679.4 |
| 6,215,460 B1 | 4/2001 | Mizoguchi et al. | |
| 6,658,130 B2 | 12/2003 | Huang | |
| 7,139,405 B1 * | 11/2006 | Grattan | H04R 1/10 381/375 |
| D583,362 S | 12/2008 | Hsu et al. | |
| 8,165,646 B2 | 4/2012 | Zheng | |
| 8,284,980 B2 | 10/2012 | Parker et al. | |
| D738,374 S | 9/2015 | Luckey et al. | |
| 9,429,759 B2 | 8/2016 | Hoellwarth | |
| 2006/0080808 A1 * | 4/2006 | Bishop | H02G 11/00 24/115 R |

(Continued)

FOREIGN PATENT DOCUMENTS

| | | |
|---|---|---|
| CN | 201374798 Y | 12/2009 |
| CN | 203465468 U | 3/2014 |

(Continued)

OTHER PUBLICATIONS

Ganapati, Priya. "Sunglasses Combines Music Player, Bluetooth Headset." *Wired.* Conde Nast, Jan. 15, 2009.

(Continued)

*Primary Examiner* — Corbett B Coburn
(74) *Attorney, Agent, or Firm* — Pearl Cohen Zedek Latzer Baratz LLP

(57) ABSTRACT

A display housing for a head mounted image display apparatus, said display housing being configured to be mounted to the head of a user with a pair of optical visual units adapted to present a virtual image to the user and a pair of earphones for providing sound to the user, each of the earphones attached to a respective side of the housing via a respective wire. The display housing comprises a linear wire retraction assembly situated thereacross, the wire retraction assembly configured to control the amount that a respective wire is pulled from the housing to allow each earphone to be selectably movable between a first, retracted state and a second, extended state.

20 Claims, 9 Drawing Sheets

(56) References Cited

U.S. PATENT DOCUMENTS

| | | | |
|---|---|---|---|
| 2008/0143954 A1* | 6/2008 | Abreu | G02C 3/003 |
| | | | 351/158 |
| 2010/0045928 A1 | 2/2010 | Levy | |
| 2012/0114162 A1* | 5/2012 | Zheng | H04R 1/1033 |
| | | | 381/384 |
| 2013/0161055 A1* | 6/2013 | Rule | H01B 7/04 |
| | | | 174/69 |
| 2013/0238829 A1 | 9/2013 | Laycock et al. | |
| 2014/0219492 A1* | 8/2014 | Pelliccio | B60N 2/0232 |
| | | | 381/389 |
| 2017/0227793 A1* | 8/2017 | Abreu | G02C 11/10 |
| 2017/0272561 A1* | 9/2017 | Kim | H04M 1/6066 |

FOREIGN PATENT DOCUMENTS

| | | |
|---|---|---|
| CN | 204887345 U | 12/2015 |
| CN | 204945492 U | 1/2016 |
| CN | 205305062 U | 6/2016 |
| JP | H11177906 A | 7/1999 |
| JP | 3371156 B2 | 1/2003 |

OTHER PUBLICATIONS

"Nytro Labs unveils new Spin retractable headphones." *What Hi-Fi?* N.p., n.d. Web., Apr. 28, 2014.

* cited by examiner

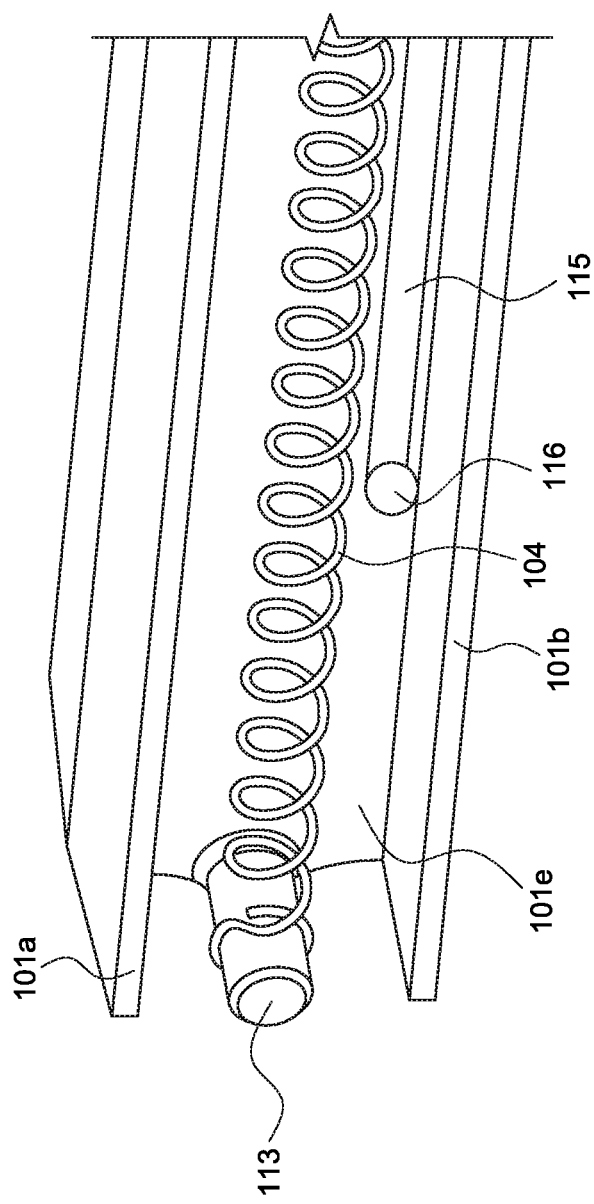

US 10,071,307 B1

VIRTUAL REALITY HEADSET WITH RETRACTABLE EARPHONES

FIELD OF THE INVENTION

The present invention relates to virtual reality ("VR") and augmented reality ("AR") headsets, and, more particularly, to a head-mounted image display unit having a wire retraction device for an earphone for use therewith.

BACKGROUND OF THE INVENTION

Head-mounted image display units, such as VR and AR headsets, are well known for use with many audio-visual applications, such as movies and video games, which include sound. In order for a complete audio-visual experience to be presented to the user, particularly with VR and AR audio-visual applications, the visual effects and the audio effects would have to be presented to the user in a synchronized manner, isolated from all other external visual and audio effects, which means that the user would have to wear a device that covers both his/her eyes and ears. However, such a device is cumbersome and very uncomfortable for the user to wear, even for short period of time.

Headsets with retractable earphones are known in the art. In most cases, the retraction mechanisms are situated in the templepiece of the headset, most often wound about a reel.

For example, U.S. Pat. No. 6,215,460 to Mizoguchi discloses a head-mounted image display apparatus that includes optical visual units that are mounted on a laterally disposed shaft and are adjustable so as to be movable toward and away from each other for establishing a correct eye spacing for a user. The apparatus also includes a retractable earphone cup receptacle mechanism having a cord wrapped around a reel that is rotatably supported in a casing with a power spring therein for biasing the reel in the winding direction. However, the retractable earphone cup receptacle mechanisms described therein are separately mounted and are not an integral part of the VR headset.

Similarly, U.S. Pat. No. 6,084,555 to Mizoguchi also discloses a spectacle type display device which enables a wearer to observe an electronically produced image, such as that produced in response to a video or television signal and which includes an improved adjustment arrangement whereby both pupil distance and diopter adjustment can be easily implemented. The device also includes a pair of headphone receiving mechanisms at the rear end sides of the pair of first bow portions from which a pair of earphones may be unreeled and inserted into the wearer's ears.

In addition, U.S. Pat. No. 5,451,976 to Ito similarly discloses an image display apparatus for reducing the occurrence of discomforts such as headaches, eyestrain, fatigue and the like in users, wherein head phone reels are installed on left and right side surfaces of the head mount so that headphone cords can appropriately be wound.

In US Patent Appl. Publ. No. 2010/0045928 to Levy, which discloses eyewear with communications capability to pair with a Bluetooth enabled device and equipped with noise cancellation software, the earphones are connected by a flexible cord to a spring-biased retraction wheel that is housed within the earpiece/templepiece.

In cases where the retractable earphones wires are spooled around a reel, however, the locations in the device at which the retractable earphones can be housed is limited, because there must be sufficient space within the device for the wire spooled around the wheel. In virtually all cases, the circular shape of the retractable earphone mechanism requires that it be housed within the templepiece of the headset, and this in turn requires that the headset have a templepiece that is large enough to house such a retractable earphone mechanism.

However, it is desirable to be able to provide a head-mounted image display apparatus (headset) that either has no templepiece or can be worn by a user without use of a templepiece that is large enough to house such a retractable earphone mechanism.

In addition, it is desirable to provide retractable earphones which can be housed within the device in a non-circular shape.

SUMMARY OF THE INVENTION

It is an object of the present invention to provide a head-mounted image display apparatus, such as a VR or AR headset, which has retractable earphones such that the earphones' wires can be housed within the VR or AR headset when not in use, and such that the earphones and its wires can extends outward to reach a user's ears for use of the headset.

It is another object of the present invention to provide such retractable earphones within the head-mounted image display apparatus in a non-circular retraction mechanism.

It is another object of the present invention to provide such retractable earphones within the head-mounted image display apparatus other than in the templepiece.

It is a further object of the invention desirable to provide a head-mounted image display apparatus (headset) that either has no templepiece or can be worn by a user without use of a templepiece that is large enough to house such a retractable earphone mechanism.

According to some embodiments of the present invention, there is provided a head-mounted image display apparatus (headset) having retractable earphones which can be housed along a bottom of the inside of the front of the headset.

According to some embodiments of the present invention, there is provided a head-mounted image display apparatus comprising a display housing configured to be mounted to the head of a user, said display housing comprising a pair of optical visual units adapted to present a virtual image to the user from an image display device; a pair of earphones for providing sound to the user, wherein each of said earphones is attached to a respective side of said housing via a respective wire; and a wire retraction assembly having a linear configuration and being situated within and across said housing, said wire retraction assembly configured to control the amount that a respective wire is pulled from said housing to allow each earphone to be selectably movable between a first, retracted state and a second, extended state.

In some embodiments of the invention, said wire retraction assembly comprises a linear housing that is situated across said display housing.

In some embodiments of the invention, each of said pair of earphones may be mounted to a respective side of said display housing on an outside thereof when in said first, retracted state. In some embodiments, the outside of said display housing comprises a recess on each side thereof to accommodate said mounted pair of earphones when in said first, retracted state. In some embodiments, each of the earphones may be moved away from said display housing so as to be inserted into a respective ear of the user when in said second, extended state.

In some embodiments of the invention, said wire retraction assembly housing contains, for each earphone, a pulley configured to move along said wire retraction assembly housing between a distal end and a proximal end, wherein the respective wire of said earphone is looped around said pulley. In some embodiments, the pulley is rotatably mounted to a pulley mount, wherein said pulley mount is configured to move linearly along said wire retraction assembly housing from a distal end to a proximal end as pulling force is applied to the respective earphone wire looped around said pulley.

In some embodiments of the invention, the display apparatus further comprises an elastic member that biases said pulley mount towards said distal end of said wire retraction assembly housing, such that, when said pulling force is removed from the respective earphone wire, said pulley is biased towards said distal end of said wire retraction assembly by a biasing force. In some embodiments, said elastic member is attached between said pulley mount and said distal end of said wire retraction assembly housing, so as to bias said pulley mount towards said distal end of said wire retraction assembly housing by tensile force of said elastic member. In some embodiments, said elastic member is attached between said pulley mount and said proximal end of said wire retraction assembly housing, so as to bias said pulley mount towards said distal end of said wire retraction assembly housing by spring force of said elastic member.

In some embodiments of the invention, said wire retraction assembly housing further comprises, for each earphone, a linear track extending from said proximal end to said distal end, and said pulley mount comprises a tracking member to allow said pulley mount to move linearly along said track within said wire retraction assembly housing, as pulling force is applied to the respective earphone wire and as said biasing force is applied by said elastic member. In some embodiments, said tracking member is a protrusion on a back side of said pulley mount that cooperates with said track to allow said pulley mount to move linearly therealong. In some embodiments, said tracking member is placed between, and is freely rotatable relative to, both a back side of said pulley mount and said linear track to allow said pulley mount to move linearly along said track. In some embodiments, said tracking member is spherically shaped.

In some embodiments of the invention, said linear track further comprises an angled or backward releasable portion configured to allow said tracking member to move into said releasable portion, whereby said pulley mount remains near said proximal end of said wire retraction assembly housing despite the biasing force applied by said elastic member exceeding said pulling force applied to the respective earphone wire. In some embodiments, said tracking member may move out of said releasable catch portion by further pulling force applied to the respective earphone wire.

According to some embodiments of the present invention, there is also provided a display housing for a head mounted image display apparatus, wherein said display housing is configured to be mounted to the head of a user with a pair of optical visual units adapted to present a virtual image to the user and a pair of earphones for providing sound to the user, each of said earphones attached to a respective side of said housing via a respective wire. In some embodiments, the display housing comprises a linear wire retraction assembly situated thereacross, said wire retraction assembly configured to control the amount that a respective wire is pulled from said housing to allow each earphone to be selectably movable between a first, retracted state and a second, extended state.

In some embodiments of the invention, the display housing further comprises a recess on a respective side thereof to allow each of said pair of earphones to be mounted thereagainst when in said first, retracted state, wherein said earphone may be removed therefrom so as to be inserted into a respective ear of the user when in said second, extended state.

In some embodiments of the invention, the wire retraction assembly contains, for each earphone, a pulley rotatably mounted to a pulley mount that is configured to move linearly along the wire retraction assembly between a first, distal end and a second, proximal end, wherein the respective wire of said earphone is looped around said pulley and exerts a pulling force on said pulley mount towards said second, proximal end.

In some embodiments of the invention, the display apparatus further comprises an elastic member that exerts a biasing force on said pulley mount towards said first, distal end.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 2E is a close perspective view of a portion of the wire retraction housing for the retractable earphones of the headset of FIGS. 1A-C.

Figure 1A:
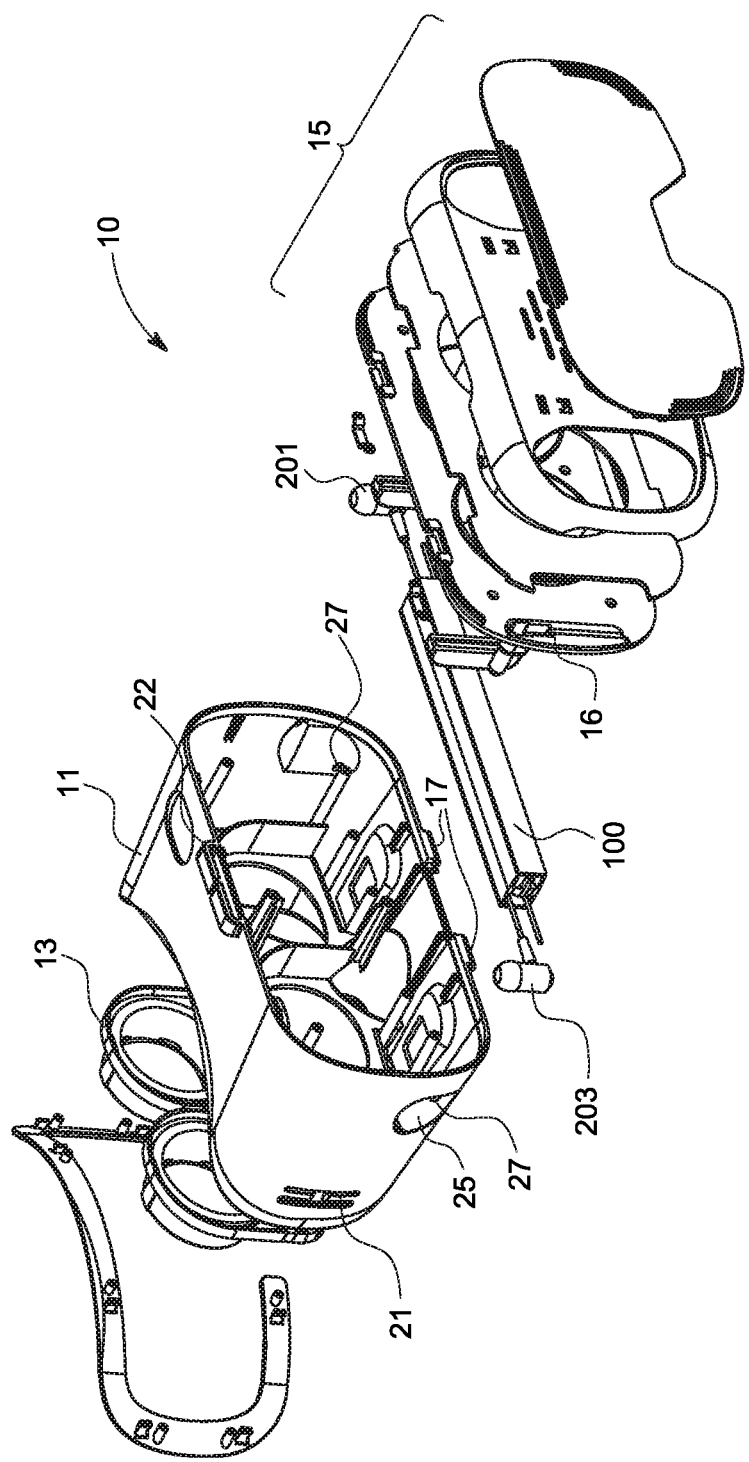
FIG. 1A is an exploded view of a head-mounted image display apparatus, such as a VR or AR headset, with retractable earphones, according to one embodiment of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will be apparent to one skilled in the art that the present invention may be practiced without the specific details presented herein. Furthermore, well known features may be omitted or simplified in order not to obscure the present invention.

Reference is made to FIG. 1A which is an exploded perspective view of a head-mounted image display apparatus 10, such as a headset, for example a virtual reality ("VR") or augmented reality ("AR") headset, with retractable earphones, according to one embodiment of the invention. As shown in FIG. 1A, headset 10 may be generally be of the sort that is mounted to the front of a user's head over the user's eyes, the headset 10 including a housing 11 into which a user peers through a set of optical visual units 13, such as lenses, and to which is mounted an image display device, such as an electronics and display panel, 15. The electronics and display panel 15 may be attached at the front of headset housing 11 in any known way, such as by hinges 17, and optical visual units (lenses) 13 are adapted to present to the user a virtual image from electronics and display panel 15. Headset 10 may be attached to the user's head through any external means, such as via a series of straps, which are secured to headset housing 11 via suitable strap mounts, such as strap mounts 21 located on the sides of the headset housing 11 and strap mount 22 located on the top of the headset housing 11.

In certain embodiments, display panel 15 may be capable of retaining therein a display device, such as a smart phone, and headset 10 may comprise an adapter plug 16 capable of mating with the display device retained by display panel 15. When the display device is retained within display panel 15, the images displayed therein are viewable by the user, for example, through optical visual units 13 and the sounds emanating therefrom are capable of being heard by the user, for example, through adapter plug 16.

In certain embodiments, headset 10 has earbuds, or earphone heads, 201,203 for providing sound to the user. Headset housing 11 may have a recess 25 on either side thereof for receiving earbuds, or earphone heads, 201,203 when they are in their retracted position and retained against the headset housing 11, as will be described below. Headset housing 11 further has an earphone retraction assembly 100 mounted therein, as will be described below, across the housing 11 for allowing earphone heads 201,203 to be selectably movable between a first, retracted state when not in use by the user and a second, extended state when in use by the user.

Figure 1B:
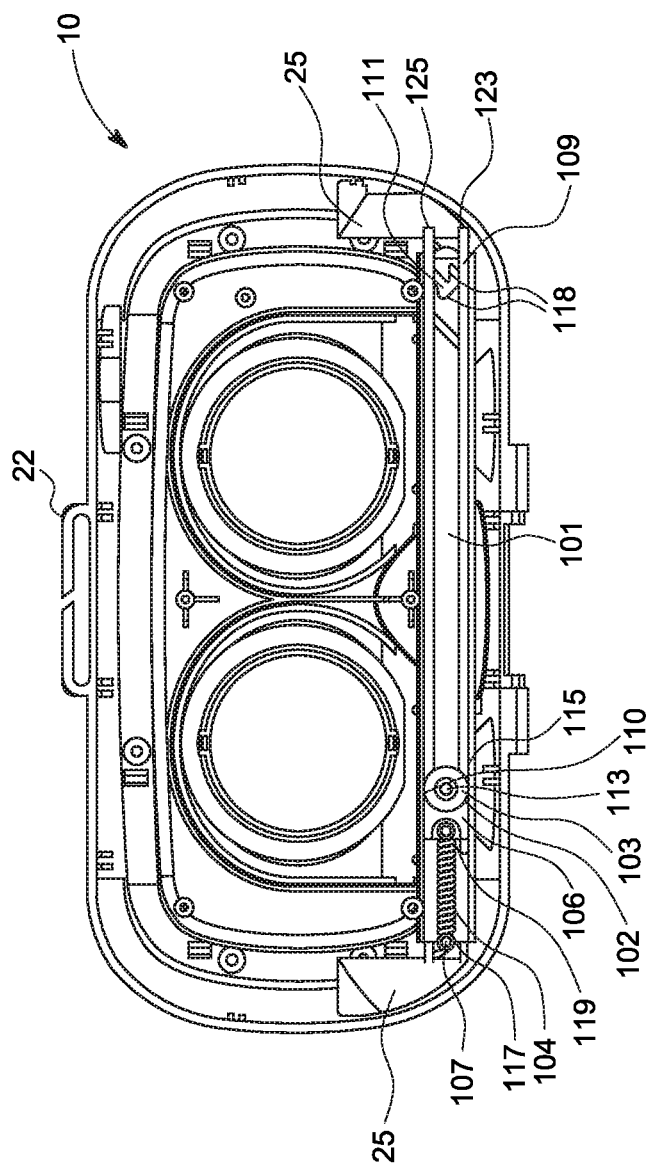
FIG. 1B is an inside front view of the headset with retractable earphones, according to one embodiment of the invention.

FIG. 1B is an inside front view of the housing 11 of headset 10 with retractable earphones, according to one embodiment of the invention, showing earphone retraction assembly 100 having a linear, i.e., non-circular, shape and being mounted near the bottom, front of the headset housing 11, under the pair of optical visual units 13. For ease of description and depiction, FIG. 1B shows only one retractable earphone mechanism within earphone retraction assembly 100, but it should be clear that two are included. In FIG. 1B, earphone head 201 is not shown at the end of earphone wire 109 for further clarity of viewing.

Figure 1C:
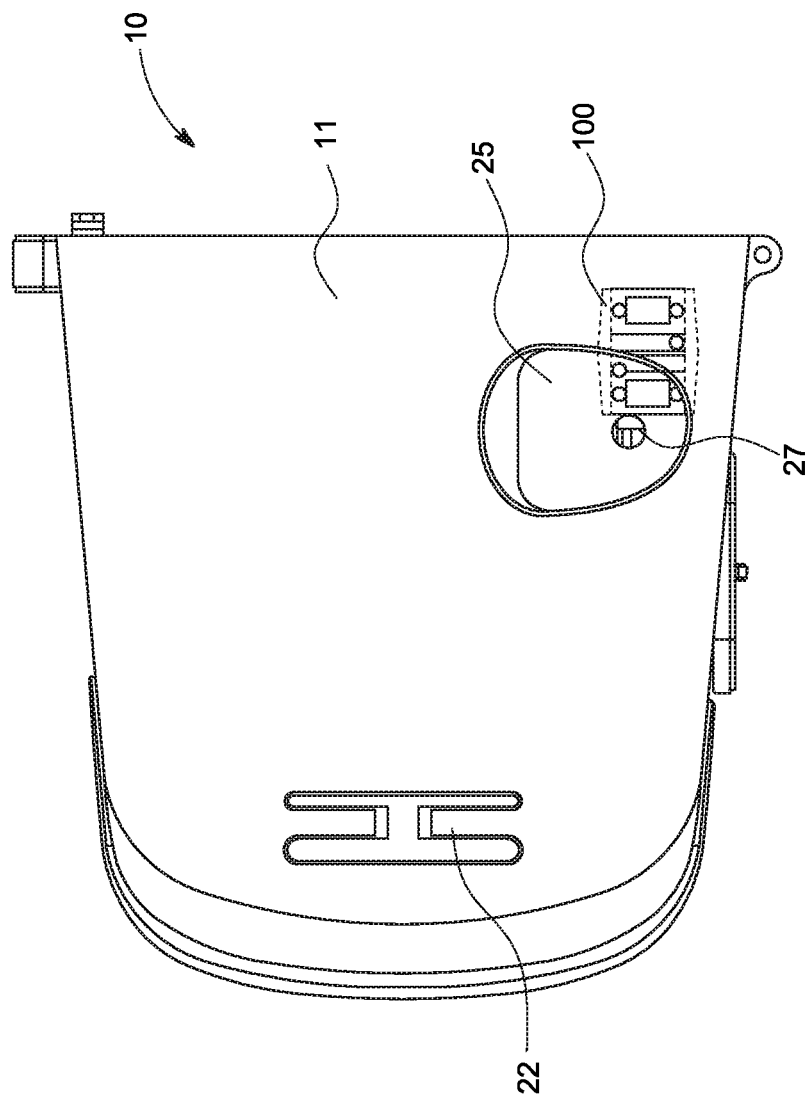
FIG. 1C is a side view of the headset housing, according to one embodiment of the invention.

FIG. 1C is a semi-transparent side view of headset housing 11, according to one embodiment of the invention, showing earphone retraction assembly 100 mounted within headset housing 11. In certain embodiments, earphone retraction assembly 100 may be mounted at a position along the bottom of headset housing 11. In certain embodiments, earphone retraction assembly 100 may be mounted at a position along the front of headset housing 11, but as shown in FIGS. 1A-C, rearward of the electronics and display panel 15. In certain embodiments, recess 25 should preferably be situated on the outside of headset housing 11 at a position adjacent to where earphone retraction assembly 100 is situated on the inside of headset housing 11, so that earphone heads 201,203 can rest within recesses 25 when fully retracted and so that no extra cord is expended once earphone heads 201,203 are fully retracted. In certain embodiments, headset housing 11 has an aperture 27 for earphone wire 109 to pass through from earphone heads, 201,203 into the earphone retraction assembly 100.

As shown in FIGS. 1A-C, headset 10 may have an earphone retraction assembly 100 having a linear, i.e., non-circular, shape and that is configured to be mounted and within headset housing 11, such as at a position along the bottom of headset housing 11, and/or across headset housing 11, and/or along the front of headset housing 11. The details of earphone retraction assembly 100 are shown in FIGS. 2A-E and discussed below.

As shown FIGS. 2A-D, earphone retraction assembly 100 includes an elongated housing 101, with a linear, i.e., non-circular, shape. Earbuds/earphone heads 201,203 are connected at the distal ends of electrical wires 109, whose proximal ends are affixed within housing 101 to a sound-producing apparatus, such as adapter plug 16, and retraction assembly 100 allows wires 109 to be pulled from housing 101 to allow earphone heads 201,203 to extend outside housing 101 and then to retract back within housing 101. Retraction assembly 100 for wire 109 of each of earphone heads 201,203 includes a pulley 102, a pulley mount 106, and an elastic member 104.

Figure 2A:
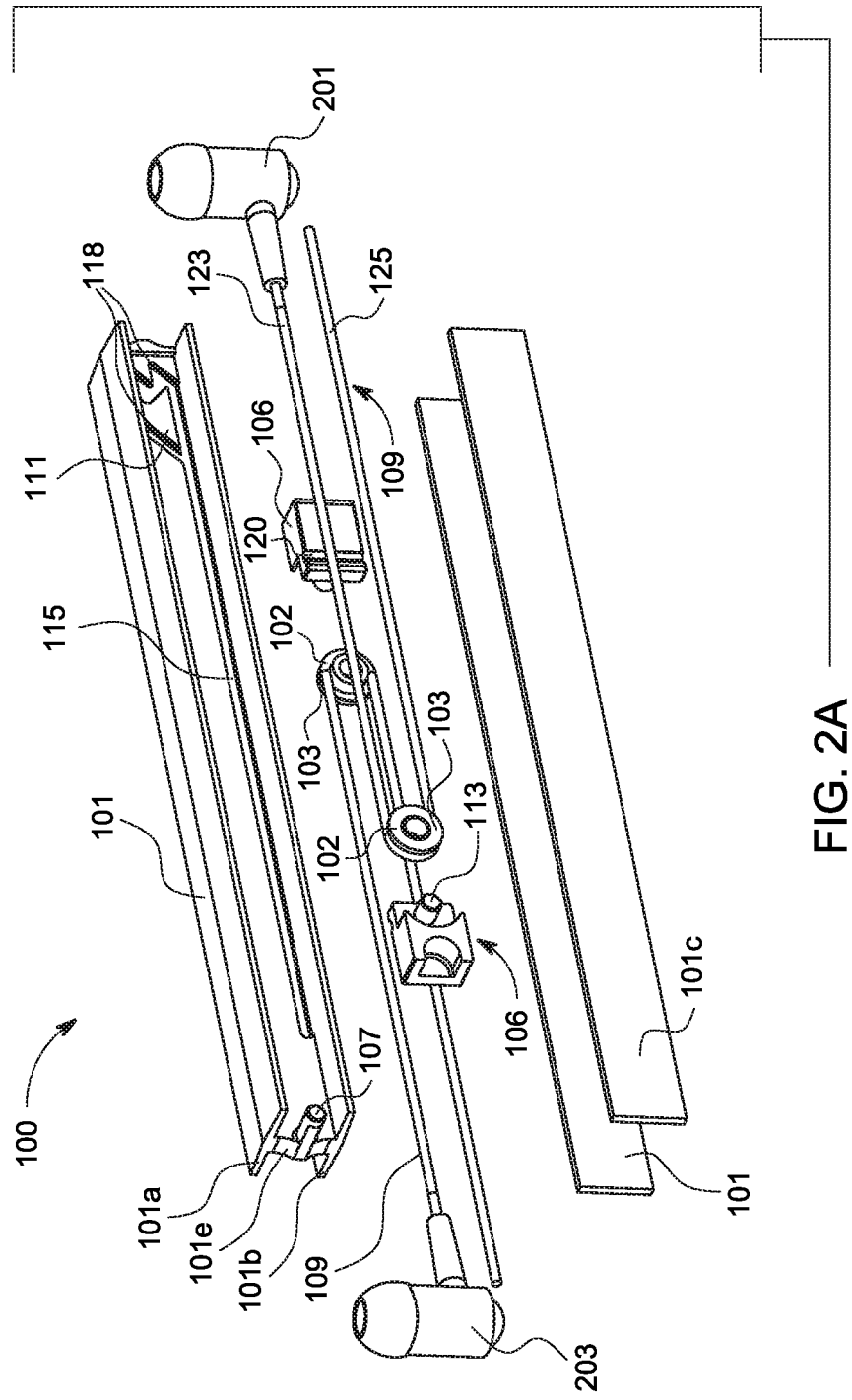
FIG. 2A is an exploded view of the wire retraction housing for the retractable earphones of the headset of FIGS. 1A-C.

FIG. 2A is an exploded perspective view of the retraction assembly 100. As shown in FIG. 2A, in certain embodiments, housing 101 contains two separate retraction assemblies 100, one for earphone head 201 and one for earphone head 203, each of which assembly has a pulley 102 and a pulley mount 106, as well as all other retraction assembly 100 parts, for retracting wire 109 of the respective earphone head within the respective earphone retraction assembly 100. The retraction assembly 100 for earphone head 201 is shown in the foreground of housing 101, and the retraction assembly 100 for earphone head 203 is shown in the background of housing 101. In certain embodiments, as also shown in FIG. 2A, the length of housing 101 may be straight, and housing 101 may be shaped like an elongated rectangular bar, for example having a top wall 101*a*, a bottom wall 101*b*, a front wall 101*c* and a back wall 101*d*, that together form the housing 101, as well as a median wall 101*e* that separates between the retraction assembly 100 for earphone head 201 and the retraction assembly 100 for earphone head 203.

Figure 2B:
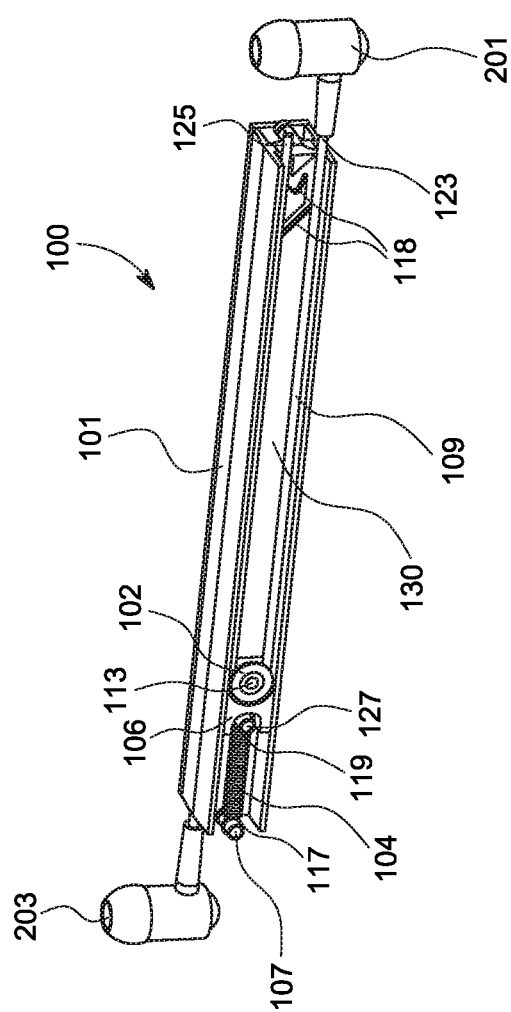
FIG. 2B is a front perspective view of the wire retraction housing for the retractable earphones of the headset of FIGS. 1A-C when the pulley is in the first position.
Figure 2C:
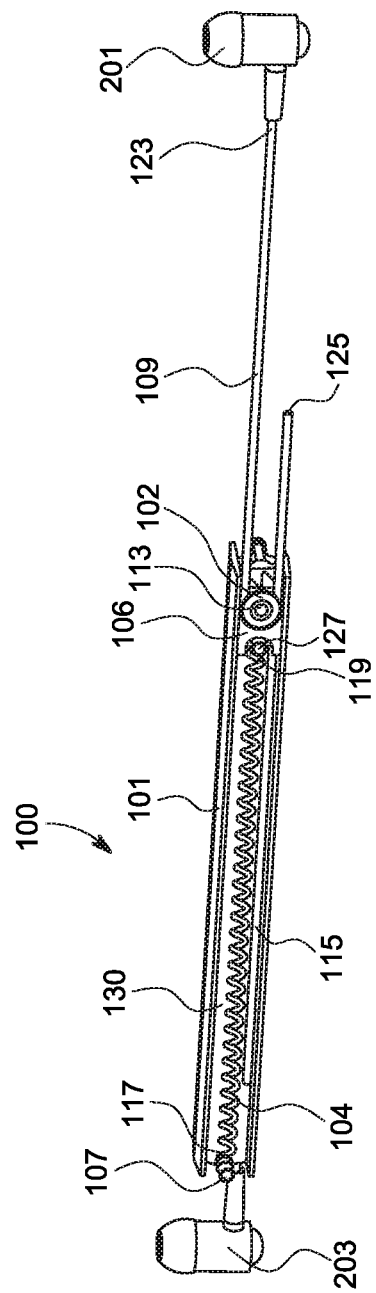
FIG. 2C is a front perspective view of the wire retraction housing for the retractable earphones of the headset of FIGS. 1A-C when the pulley is in the second position.

FIG. 2B is a front perspective view of the earphone retraction housing 101, with front wall 101*c* schematically absent, showing pulley 102 and earphone head 201 in the foreground, as well as earphone head 203 in the background, in a first, retracted position. FIG. 2C is a front perspective view of the earphone retraction housing 101, again with front wall 101*c* schematically absent, showing pulley 102 and earphone head 201 in the foreground in a second, extended position. In FIGS. 2B and 2C, only the retraction assembly 100 for earphone head 201 is shown, such that in FIG. 2C pulley 102 and earphone head 201 are shown in the second, extended position within earphone retraction housing 101, but earphone head 203 in the background is shown as not having moved from its first, retracted position as shown in FIG. 2B.

Figure 2D:
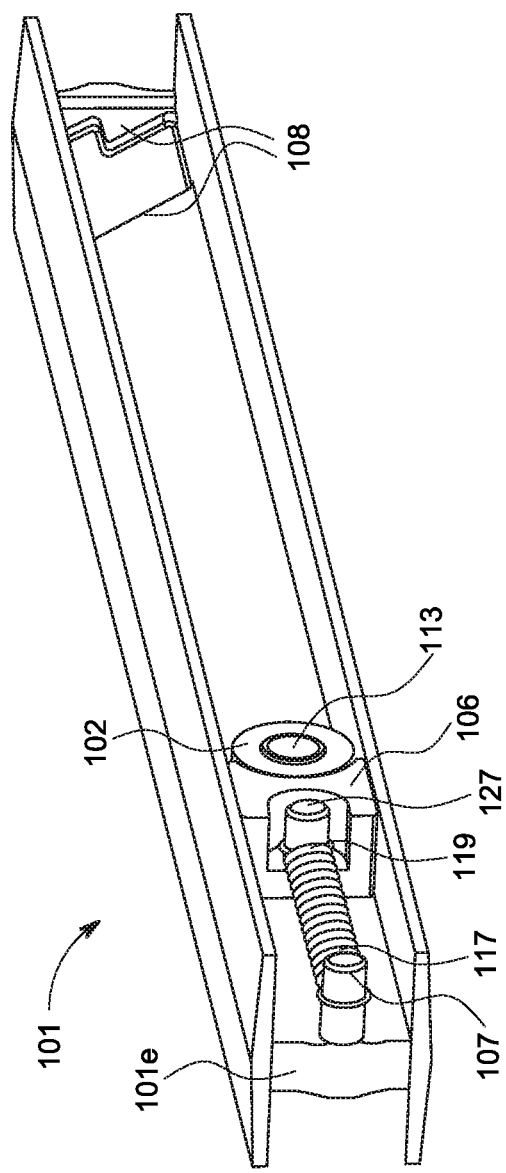
FIG. 2D is a semi-transparent perspective view of the wire retraction housing for the retractable earphones of the headset of FIGS. 1A-C.

FIG. 2D is a semi-transparent perspective view of the earphone retraction housing 101, showing, in part, the retraction assembly 100 for the wire 109 of earphone head 201 in the foreground and the retraction assembly 100 for the wire 109 of earphone head 203 in the background.

The earphone wire 109 may have a first end 123 and a second end 125. The first end 123 of the wire 109 can be connected to one of the retractable earphone heads 201,203 so as to move therewith. The second end 125 of the wire 109 can be connected to a fixed position at the inside of headset 100, in certain embodiments within housing 101 of earphone retraction assembly 100. In one embodiment, as shown in FIGS. 2A-D, housing 101 may substantially contain the entire length of wire 109 when the pulley 102 is in a first, retracted position 110 within elongated housing 101 such that the wire 109 does not protrude outside of the headset housing 11. In one embodiment, housing 101 may contain a portion of the wire 109 when the pulley 102 is in a second, extended position 111 within elongated housing 101 such that the wire 109 protrudes outside of the headset housing 11.

The earphone wire 109 may have a length that is at least long enough so that a user may comfortably place the respective earphone head 201,203 in the user's ear when the pulley 102 is in the second, extended position 111 within elongated housing 101. The earphone wire 109 may pass through aperture 27 in headset housing 11 so that, while second end 125 may be attached within headset 100, e.g., within housing 101 of earphone retraction assembly 100, e.g., to adapter plug 16, the first end 123 and its attached respective earphone head 201,203 are retained in recess 25 on the outside of headset 100.

As shown in FIG. 2A, pulley 102 may have the form of a wheel 103, so as to allow and wire 109 can loop or curl around wheel 103. Pulley 102 may be rotatably mounted to a pulley mount 106 via an axle 113. The wheel 103 of pulley 102 may be rotatably attached to the pulley mount 106 by axle 113 such that pulley 102 can freely rotate about axle 113 along with the movement of the wire 109 in whichever direction wire 109 pulls pulley 102.

In certain embodiments, pulley 102 may have a groove (not shown) around the wheel 103 such that wire 109 can loop around wheel 103 within the groove, so that wire 109 does not slip when looped or curled around wheel 103. The groove of the pulley 102 can support a movement of the wire 109 along a circumference of the wheel 103.

In some embodiments of the invention, the pulley 102 can be a wheel, a ball or a cylinder. The wheel, the ball or the cylinder may have a groove which the wire 109 can loop around. The wheel, the ball or the cylinder may have an axle 113 about which it is rotatably mounted, and axle 113 may extend from the pulley 102 in a direction perpendicular to a plane in which the pulley 102 and a circumference of the groove is located.

In some embodiments of the invention, the earphone retraction assembly housing 101 includes guides to keep the wire 109 taught and from moving out of housing 101 as the wire 109 moves around the circumference of the pulley 102. In some embodiments of the invention, the length of the elongated housing 101 can be substantially straight such that the wire 109 does not prevent the pulley 102 from turning about axle 113 along with the movement of the wire 109 along the circumference of pulley 102.

In some embodiments, an elastic member 104 can be included so as to bias pulley 102 towards the first, retracted position 110 within housing 101, so as to aid in retraction of wire 109.

In certain embodiments, earphone retraction assembly housing 101 may also have a fixed mount 107 at one end of housing 101, to aid in retraction of wire 109. In some embodiments, an elastic member 104 can be attached, at a first end 117 thereof, to the fixed mount 107 at the first end of elongated housing 101 and, at a second end 119 thereof, to the pulley mount 106, for example to a post 127 or some other attachment means thereon. The elastic member 104 can be any member that provides elasticity without permanent deformation, such as a spring, a rubber band, a bungee cord, or the like. The elastic member 104 can be attached to either, or both, of the fixed mount 107 at one end of track 105 and to post 127 on the pulley mount 106 by using a hook, a ring, a clasp or any other similar attachment means. In some embodiments of the invention, elastic member 104 can be attached, at the second end 119 thereof, to a point on the axle 113 on pulley mount 106.

As shown in FIG. 2B, the fixed mount 107 of the housing 101 can be located at a proximal end of the housing 101, such that the elastic member 104 is in a relaxed state when the pulley 102 and pulley mount 106 are in the first, retracted position 110 within housing 101 adjacent to the fixed mount 107. The length of the wire 109 is substantially contained within the housing 101 when the elastic member 104 is not in a stretched state.

When earphone head 201 is removed from recess 25 on the outside of headset housing 11 and pulled outward, e.g., so as to be placed in a user's ear, the first end 123 of earphone wire 109 may be pulled through aperture 27 from inside headset housing 11 to the outside thereof. Because the second end 125 of wire 109 is fixedly attached within housing 101 of earphone retraction assembly 100, the pulley 102 is caused to move from the first, retracted position 110 within elongated housing 101 to the second, extended position 111 within elongated housing 101.

As shown in FIG. 2C, when pulley 102 is pulled from the first, retracted position 110 within elongated housing 101 to the second, extended position 111 within elongated housing 101, pulley 102 and pulley mount 106 are pulled by wire 109 so as to move along elongated housing 101 from its proximal end towards its distal end, thereby stretching elastic member 104. Thus, the elastic member 104 is in a progressively more stretched state when pulley 102 and pulley mount 106 are moved further along housing 101 until pulley 102 is secured in the second, extended position 111 within elongated housing 101 opposite to the first, retracted position 110 within elongated housing 101. An elastic (tensile) force is exerted by elastic member 104 back toward the fixed point 107 at the proximal end of housing 101, pulling pulley 102 from the second, extended position 111 at the distal end of elongated housing 101.

In certain embodiments, earphone retraction assembly housing 101 may have a mechanism for guiding pulley 102 along elongated housing 101 and for securing pulley 102 in the second, extended position 111 at the distal end of elongated housing 101. In one such embodiment, housing 101 could be provided with a track 115, e.g., formed in one of the walls of housing 101, to aid pulley 102 and pulley mount 106 in their movement along elongated housing 101. In certain embodiments, as shown in FIG. 2A, track 115 is formed into, or through, median wall 101e, and runs from the first, proximal end of housing 101 to the second, distal end of housing 101. As shown in FIG. 2A, track 115 may be formed along a lower edge of median wall 101e.

In one embodiment, a tracking member may be provided on pulley 102 or on pulley mount 106, for example on the back side thereof, i.e., the side that faces median wall 101e. In certain embodiments, the tracking member is aligned with and fits into track 115, and allows pulley 102 or pulley mount 106 to be guided along the length of housing 101 by virtue of the cooperation of the tracking member with track 115 when pulled by wire 109.

In once such embodiment, the tracking member may be a protrusion (not shown) that protrudes from the back side of pulley mount 106 and that is aligned with and fits into track 115.

In another embodiment, as shown in FIG. 2E, elongated housing 101 could also be provided with a rotatable or movable tracking member 116, that is placed between median wall 101e and a recess on the back of either pulley 102 or pulley mount 106 and is freely rotatable with respect to said back of said pulley mount 106 and said track 115. In one embodiment, the rotatable or movable tracking member 116 has a special shape, such as a ball. Ball 116 can be formed of any suitable material, such as plastic, metal, e.g., steel, etc.

FIG. 2E shows ball 116 within track 115 and elastic member 104 being stretched, with pulley 102 and pulley mount 106 absent. Ball 116 is placed against pulley 102 or pulley mount 106, for example on the back side thereof, i.e., the side thereof that faces median wall 101e, such that ball 116 is aligned with and fits into track 115. In certain embodiments, ball 116 is placed in channel 120 on the back side of pulley mount 106. Ball 116 is able to rotate freely relative to pulley 102 or pulley mount 106 and relative to track 115, and ball 116 acts as a guide, keeping pulley 102 or pulley mount 106 in place along the length of housing 101 by virtue of the cooperation of ball 116 with track 115 as wire 109 is pulled and released.

In some embodiments of the invention, as shown best in FIG. 2A, track 115 has a releasable catch 118 at the distal end thereof that enables pulley 102 and pulley mount 106 to stop and "locked" in the second, extended position 111 at the distal end of elongated housing 101, as shown in FIG. 2C, thereby allowing wire 109 and its attached earphone head 201 to be semi-permanently pulled out. The releasable catch 118 can be located on the distal end of the track 105 opposite to the proximal end of track 115. In certain embodiments, releasable catch 118 may be in the form of an angled or an upward and backward groove or track portion, for example in a V-shape, that can secure the pulley 102 and/or the pulley mount 106 at the second position 111 at the distal end of housing 101. When pulley 102 and pulley mount 106 are pulled by wire 109 its attached earphone head 201 away from the first, proximal position 110 in housing 101 and towards the second position 111, pulley 102 and pulley mount 106 are guided along track 115. In one embodiment, the protrusion (not shown) moves distally in track 115 as pulley mount 106 moves along housing 101. In another embodiment, ball 116 is mounted within channel 120 on the back of pulley mount 106 and is trapped between pulley mount 106 and track 115, so as to move distally in track 115 as pulley mount 106 moves along housing 101.

As shown in FIGS. 2A-D, releasable catch 118 operates by providing pulley mount 106 with a place to rest in track 115, so that tensile force need not be exerted on wire 109 in order to keep pulley 102 and pulley mount 106 in the second, extended position 111 at the distal end of elongated housing 101. Once pulley 102 and pulley mount 106 have been pulled by tension on wire 109 from the first, retracted position 110 within elongated housing 101 to the second, extended position 111 at the distal end of elongated housing 101, such that the protrusion (not shown) or ball 116 has moved with pulley mount 106 along track 115, tensile force on wire 109 is slightly released, whereby the pulling force of elastic member 104 pulls pulley 102 and pulley mount 106 backwards in housing 101, such that the protrusion or ball 116 moves backwards in track 115 and upwards into releasable catch 118. In the embodiment using ball 116, ball 116 also moves upwards within channel 120 as it moves upwards into releasable catch 118, so that pulley mount 106 is able to always rest on bottom wall 101b of housing 101. In some embodiments of the invention, pulley 102 and pulley mount 106 move into releasable catch 118 only when wire 109 is pulled at an angle, thereby allowing the protrusion or ball 116 to move upwards into releasable catch 118 rather than simply backwards within track 115.

Once ball 116 is set in releasable catch 118, pulley 102 and pulley mount 106 remain fixed within releasable catch 118, despite the pulling force of elastic member 104. In fact, pulley 102 and pulley mount 106 are maintained in their position within releasable catch 118 by the pulling force of elastic member 104 which tends to pull ball 116 backward, into the backward groove of releasable catch 118. No further tensile force need be exerted on wire 109 in order to keep pulley 102 and pulley mount 106 in the second, extended position 111 at the distal end of elongated housing 101.

Pulley 102 and pulley mount 106 can be released from releasable catch 118 so as to move from the second, extended position 111 housing 101 by pulling distally on wire 109 and its attached earphone head 201, thereby pulling pulley 102 and pulley mount 106 from releasable catch 118 such that ball 116 moves from releasable catch 118 down the "V" groove and back into track 115, eventually resting in its original position adjacent the proximal end of housing 101. In some embodiments of the invention, pulley 102 and pulley mount 106 can be released from releasable catch 118 only when wire 109 is pulled at an angle. In some embodiments of the invention, the releasable catch 118 includes a button or a switch for releasing the pulley 102 from the second position 111 on the track 105.

As discussed above with regard to FIG. 2A, housing 101 may have a median wall 101e that separates between the retraction assembly 100 for earphone head 201 and the retraction assembly 100 for earphone head 203. As such, behind median wall 101e is a second retraction assembly 100 for earphone head 203 that may function similarly to and/or contain the same type of parts as the retraction assembly 100 for earphone head 201.

Figure 2F:
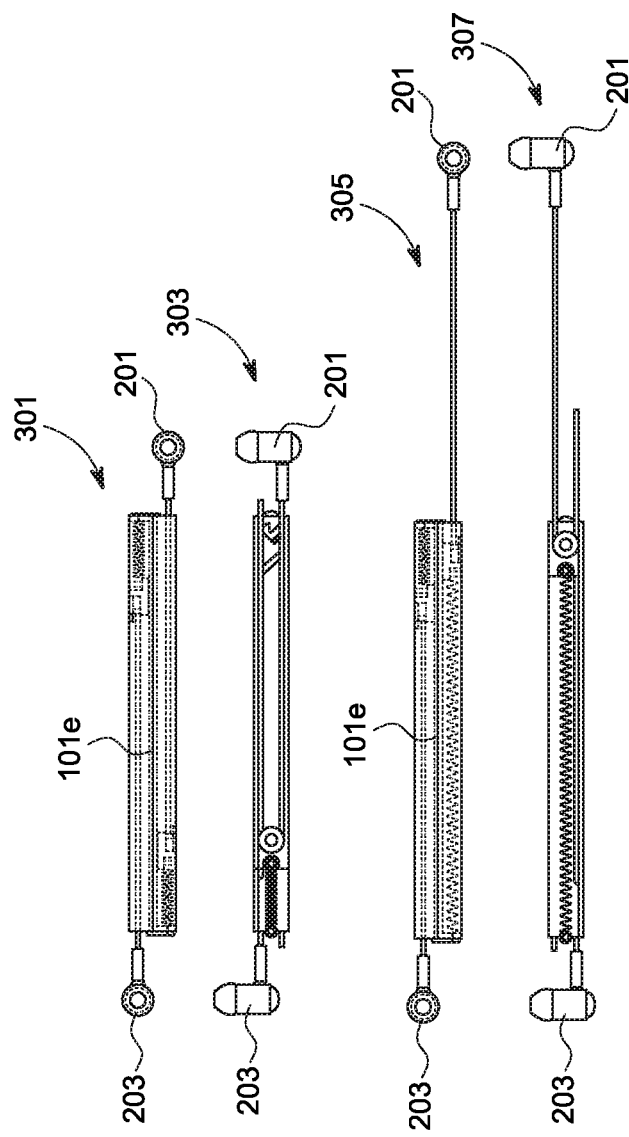
FIG. 2F are various views of the wire retraction housing for the retractable earphones of the headset of FIGS. 1A-C.

FIG. 2F shows various views of housing 101 showing top and side views of both retractable earphones 201,203 of FIGS. 1A-E.

View 301 in FIG. 2F is top view of housing 101 showing earphone retraction assemblies 100 of both earphone heads 201,203 when earphone heads 201,203 retracted. In this view, both respective pulleys 102 are in a first, retracted position 110 and both respective elastic members 104 are in a relaxed, unextended state. View 303 in FIG. 2F is a side view, 90° rotated, of view 301.

View 305 in FIG. 2F is a top view of housing 101 of earphone retraction assemblies 100 of both earphone heads 201,203 when earphone head 203 is retracted but earphone head 201 is extended. In this view, pulley 102 of earphone head 201 is in the second, extended position 111 and elastic member 104 of earphone head 201 is in a stretched, extended state. In addition, in this view, pulley 102 of earphone head 203 is a first, retracted position 110 and elastic member 104 of earphone head 203 is in a relaxed, unextended state. View 307 in FIG. 2F is a side view, 90° rotated, of view 301.

In some embodiments of the invention, as opposed to the elastic member 104 discussed above, which provides its elastic (tensile) force upon expansion, the elastic member 104 may provide its elastic (spring) force upon compression.

In such embodiments, the fixed mount 107 of the housing 101 to which the elastic member 104 is attached may be adjacent the second, extended position 111 at the distal end of track 115 and on an end of the track 115 opposite to first, retracted position 110 at the proximal end of track 115. In this embodiment, elastic member 104 is in an extended, relaxed state when pulley 102 is at the proximal end of housing 101, and is in a compressed state when the pulley 102 is secured at the distal end of housing 101, which is opposite to the elastic member described above and shown in FIGS. 2A-F. Then, pulley 102 is pushed, via the elastic (spring) force of elastic member 104, towards the first, retracted position 110 on track 115 when pulley 102 is released from the second, extended position 111 on track 115. In this embodiment, the length of wire 109 is substantially contained within housing 101 when elastic member 104 is in an uncompressed state.

Thus, a non-circular shaped housing for retractable earphones has been provided. One skilled in the art will appreciate that the present invention can be practiced by other than the described embodiments, which are presented for purposes of illustration and not limitation. In addition, different embodiments are disclosed herein, and features of certain embodiments may be combined with features of other embodiments, such that certain embodiments maybe combinations of features of multiple embodiments. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

The invention claimed is:

1. A head mounted image display apparatus, comprising:
   a display housing configured to be mounted to the head of a user, said display housing comprising a pair of optical visual units adapted to present a virtual image to the user from an image display device;
   a pair of earphones for providing sound to the user, wherein each of said earphones is attached to a respective side of said housing via a respective wire; and
   a wire retraction assembly having a linear configuration and being situated within and across said housing, said wire retraction assembly configured to control the amount that a respective wire is pulled from said housing to allow each earphone to be selectably movable between a first, retracted state and a second, extended state.

2. The display apparatus according to claim 1, wherein each of said pair of earphones may be mounted to a respective side of said display housing on an outside thereof when in said first, retracted state.

3. The display apparatus according to claim 2, wherein the outside of said display housing comprises a recess on each side thereof to accommodate said mounted pair of earphones when in said first, retracted state.

4. The display apparatus according to claim 1, wherein each of said pair of earphones may be moved away from said display housing so as to be inserted into a respective ear of the user when in said second, extended state.

5. The display apparatus according to claim 1, wherein said wire retraction assembly comprises a linear housing that is situated across said display housing.

6. The display apparatus according to claim 1, wherein said wire retraction assembly housing contains, for each earphone, a pulley configured to move along said wire retraction assembly housing between a distal end and a proximal end, wherein the respective wire of said earphone is looped around said pulley.

7. The display apparatus according to claim 6, wherein said pulley is rotatably mounted to a pulley mount, wherein said pulley mount is configured to move linearly along said wire retraction assembly housing from a distal end to a proximal end as pulling force is applied to the respective earphone wire looped around said pulley.

8. The display apparatus according to claim 7, further comprising an elastic member that biases said pulley mount towards said distal end of said wire retraction assembly housing, such that, when said pulling force is removed from the respective earphone wire, said pulley is biased towards said distal end of said wire retraction assembly by a biasing force.

9. The display apparatus according to claim 8, wherein said elastic member is attached between said pulley mount and said distal end of said wire retraction assembly housing, so as to bias said pulley mount towards said distal end of said wire retraction assembly housing by tensile force of said elastic member.

10. The display apparatus according to claim 8, wherein said elastic member is attached between said pulley mount and said proximal end of said wire retraction assembly housing, so as to bias said pulley mount towards said distal end of said wire retraction assembly housing by spring force of said elastic member.

11. The display apparatus according to claim 7, wherein said wire retraction assembly housing further comprises, for each earphone, a linear track extending from said proximal end to said distal end, and said pulley mount comprises a tracking member to allow said pulley mount to move linearly along said track within said wire retraction assembly housing, as pulling force is applied to the respective earphone wire and as said biasing force is applied by said elastic member.

12. The display apparatus according to claim 11, wherein said tracking member is a protrusion on a back side of said pulley mount that cooperates with said track to allow said pulley mount to move linearly therealong.

13. The display apparatus according to claim 11, wherein said tracking member is placed between, and is freely rotatable relative to, both a back side of said pulley mount and said linear track to allow said pulley mount to move linearly along said track.

14. The display apparatus according to claim 13, wherein said tracking member is spherically shaped.

15. The display apparatus according to claim 11, wherein said linear track further comprises an angled or backward releasable portion configured to allow said tracking member to move into said releasable portion, whereby said pulley mount remains near said proximal end of said wire retraction assembly housing despite the biasing force applied by said elastic member exceeding said pulling force applied to the respective earphone wire.

16. The display apparatus according to claim 15, wherein said tracking member may move out of said releasable catch portion by further pulling force applied to the respective earphone wire.

17. A display housing for a head mounted image display apparatus, wherein said display housing is configured to be mounted to the head of a user with a pair of optical visual units adapted to present a virtual image to the user and a pair of earphones for providing sound to the user, each of said earphones attached to a respective side of said housing via a respective wire, the display housing comprising:

a linear wire retraction assembly situated thereacross, said wire retraction assembly configured to control the amount that a respective wire is pulled from said housing to allow each earphone to be selectably movable between a first, retracted state and a second, extended state.

18. The display housing according to claim 17, further comprising a recess on a respective side thereof to allow each of said pair of earphones to be mounted thereagainst when in said first, retracted state, wherein said earphone may be removed therefrom so as to be inserted into a respective ear of the user when in said second, extended state.

19. The display apparatus according to claim 17, wherein said wire retraction assembly contains, for each earphone, a pulley rotatably mounted to a pulley mount that is configured to move linearly therealong between a first, distal end and a second, proximal end, wherein the respective wire of said earphone is looped around said pulley and exerts a pulling force on said pulley mount towards said second, proximal end.

20. The display apparatus according to claim 19, further comprising an elastic member that exerts a biasing force on said pulley mount towards said first, distal end.

\* \* \* \* \*